United States Patent
Utley et al.

(10) Patent No.: US 10,127,833 B1
(45) Date of Patent: Nov. 13, 2018

(54) VIDEO RELAY SERVICE, COMMUNICATION SYSTEM, AND RELATED METHODS FOR PROVIDING REMOTE ASSISTANCE TO A SIGN LANGUAGE INTERPRETER DURING A COMMUNICATION SESSION

(71) Applicant: SORENSON IP HOLDINGS LLC, Salt Lake City, UT (US)

(72) Inventors: Barry Utley, Syracuse, UT (US); Lane Walters, American Fork, UT (US); Jesse Parent, Cottonwood Heights, UT (US); Janet Esposito, Layton, UT (US); Tyson Peterson, Washington Terrace, UT (US)

(73) Assignee: SORENSON IP HOLDINGS LLC, Salt Lake City, UT (US)

( * ) Notice: Subject to any disclaimer, the term of this patent is extended or adjusted under 35 U.S.C. 154(b) by 0 days.

(21) Appl. No.: 15/809,503

(22) Filed: Nov. 10, 2017

(51) Int. Cl.
| | |
|---|---|
| *H04N 7/15* | (2006.01) |
| *G09B 21/00* | (2006.01) |
| *G09B 5/06* | (2006.01) |
| *H04L 29/06* | (2006.01) |
| *H04L 29/08* | (2006.01) |

(52) U.S. Cl.
CPC ........... *G09B 21/009* (2013.01); *G09B 5/065* (2013.01); *H04L 65/4053* (2013.01); *H04N 7/152* (2013.01); *H04L 67/10* (2013.01)

(58) Field of Classification Search
None
See application file for complete search history.

(56) References Cited

U.S. PATENT DOCUMENTS

| | | |
|---|---|---|
| 5,668,863 A | 9/1997 | Bieselin et al. |
| 5,825,869 A | 10/1998 | Brooks et al. |
| 5,841,852 A | 11/1998 | He |
| 6,171,112 B1 | 1/2001 | Clark et al. |
| 6,185,292 B1 | 2/2001 | Miloslavsky |
| 6,408,066 B1 | 6/2002 | Andruska et al. |
| 6,587,556 B1 | 7/2003 | Judkins et al. |
| 6,925,155 B2 | 8/2005 | Reynolds et al. |
| 7,016,479 B2 * | 3/2006 | Flathers .............. H04L 12/2854 379/265.13 |
| 7,142,643 B2 | 11/2006 | Brooksby |
| 7,558,221 B2 | 7/2009 | Nelson et al. |
| 7,746,984 B2 | 6/2010 | Nola et al. |
| 7,792,676 B2 | 9/2010 | Klinefelter et al. |
| 8,199,896 B2 | 6/2012 | Portman et al. |

(Continued)

FOREIGN PATENT DOCUMENTS

| | | |
|---|---|---|
| EP | 1111890 A2 | 6/2001 |
| GB | 2355558 | 4/2001 |
| WO | 2008051961 A2 | 5/2008 |

*Primary Examiner* — Creighton H Smith
(74) *Attorney, Agent, or Firm* — TraskBritt

(57) ABSTRACT

Video relay services, communication systems, and methods are disclosed herein. The video relay service is for providing sign language translation services during a real-time communication session between a hearing-impaired user and a hearing-capable user. The video relay service is configured to create a video conference and an audio conference for a remote video interpreter at a remote video interpreter work station to provide teaming assistance request for a first video interpreter work station of the video relay service.

20 Claims, 5 Drawing Sheets

(56) References Cited

U.S. PATENT DOCUMENTS

| | | |
|---|---|---|
| 8,583,466 B2 | 11/2013 | Margulies et al. |
| 8,610,755 B2 | 12/2013 | Brooksby et al. |
| 8,842,158 B2 * | 9/2014 | Sellers-Blais ....... H04L 65/1009 348/14.08 |
| 2002/0010608 A1 | 1/2002 | Faber et al. |
| 2004/0161090 A1 | 8/2004 | Digate et al. |
| 2005/0251421 A1 | 11/2005 | Chang et al. |
| 2006/0234193 A1 | 10/2006 | Sahashi |
| 2007/0263810 A1 | 11/2007 | Sterns |
| 2008/0025493 A1 | 1/2008 | Paras et al. |
| 2008/0059209 A1 | 3/2008 | Larsen |
| 2008/0275311 A1 | 11/2008 | Haq |
| 2009/0005038 A1 | 1/2009 | Yasrebi et al. |
| 2009/0210558 A1 | 8/2009 | Bocook et al. |
| 2010/0066803 A1 | 3/2010 | Robotka |
| 2010/0112530 A1 | 5/2010 | Schoenbach |
| 2011/0061004 A1 | 3/2011 | Tripathi et al. |
| 2011/0288884 A1 | 11/2011 | Algoo et al. |
| 2017/0251172 A1 * | 8/2017 | McNelley ............... H04N 7/142 |
| 2018/0167417 A1 * | 6/2018 | Kirner .................... H04L 63/10 |

* cited by examiner

VIDEO RELAY SERVICE, COMMUNICATION SYSTEM, AND RELATED METHODS FOR PROVIDING REMOTE ASSISTANCE TO A SIGN LANGUAGE INTERPRETER DURING A COMMUNICATION SESSION

TECHNICAL FIELD

The application relates to telecommunication systems generally, including video relay services that provide sign language interpretive services for hearing-impaired users. More specifically, the disclosure relates to systems and methods for providing remote assistance to a human interpreter during a live communication session.

BACKGROUND

Traditional communication systems, such as standard and cellular telephone systems, enable verbal communications between people at different locations. Communication systems for hard-of-hearing individuals may also enable non-verbal communications instead of, or in addition to, verbal communications. Some communication systems for hard-of-hearing people enable communications between communication devices for hard-of-hearing people and communication systems for hearing users (e.g., standard telephones, cellular telephones, etc.) For example, a video relay service (VRS) may provide speech to sign language translation services, and sign language to speech translation services for a communication session between a video phone for a hearing-impaired user and a traditional telephone for a hearing-capable user. With conventional VRS systems, the hearing-impaired user communicates (e.g., via sign language) with a human call assistant (sometimes called a "sign language interpreter" or "video interpreter") over a first connection, and the human call assistant conveys (e.g., via voice) the messages with the far-end user over a second connection.

VRS providers may employ a number of video interpreters working at different call centers. The video interpreters provide the sign language assistance for certain calls, and then wait for the next call with which to assist. During a call, a video interpreter may desire additional assistance for certain situations. For example, a less experienced video interpreter may encounter a situation in which a more experienced video interpreter may be helpful. Such situations may include difficulty in working with one of the parties to the call, difficulty in understanding, difficulty in dealing with unfamiliar subject matter, language, or terminology, among other reasons. Typically, the video interpreter may request assistance from one of the local video interpreters within the respective call center. Such a request may be performed manually through the video interpreter's work station or in some cases automatically in some situations (e.g., an emergency 911 call). This may be referred to as a "teaming request." The assisting video interpreter who accepts the teaming request may then log out of their call station and physically move to the call station of the video interpreter requesting the assistance. Typically, the assisting video interpreter stays to the side (off camera) so that the assisting video interpreter is able to provide the assistance or guidance to the requesting video interpreter without being a distraction to the hearing-impaired user who is communicating with the original video interpreter (i.e., the requesting video interpreter). Occasionally, the video interpreters may change places if needed to adequately meet the needs of the call.

BRIEF SUMMARY

In some embodiments, described is a communication system for providing sign language translation services during a real-time communication session. The communication system comprises a video relay service (VRS) configured to establish a first connection for transmitting a video stream between a first video interpreter workstation associated with a video interpreter and a video communication device associated with a hearing-impaired user, establish a second connection for transmitting an audio stream between the first video interpreter workstation and a far-end communication device associated with a hearing-capable user, and create a video conference and an audio conference for a second video interpreter at a second video interpreter work station to provide teaming assistance receiving a teaming request from the first video interpreter workstation. The first video interpreter work station and the second video interpreter work station are located at different call centers remote from each other.

A video relay service comprises a plurality of call centers having one or more video interpreter work stations associated with video interpreters to provide sign language interpretation to assist hearing-impaired users in communicating with hearing-capable users during real-time communication sessions, and a routing server operably coupled with the video interpreter work stations at the plurality of call centers. The routing server is configured to facilitate a teaming request from a requesting video communication workstation for assistance from an assisting video communication workstation at a remote call center during a real-time communication session.

A method of facilitating a remote teaming session during a real-time communication session with a hearing-capable user, a hearing-impaired user, and a video interpreter within a video relay service is disclosed. The method comprises generating a teaming request for a requesting video interpreter workstation of the video relay service during a communication session with a video communication device associated with the hearing-impaired user and a far-end communication device associated with the hearing-impaired user, transmitting a teaming message to a remote video interpreter workstation at a different call center location than the requesting video interpreter workstation, displaying the teaming message on an electronic display of the remote video interpreter workstation requesting acceptance or rejection of the teaming request, and creating a video conference and an audio conference to facilitate the remote teaming session.

DETAILED DESCRIPTION

Figure 1:
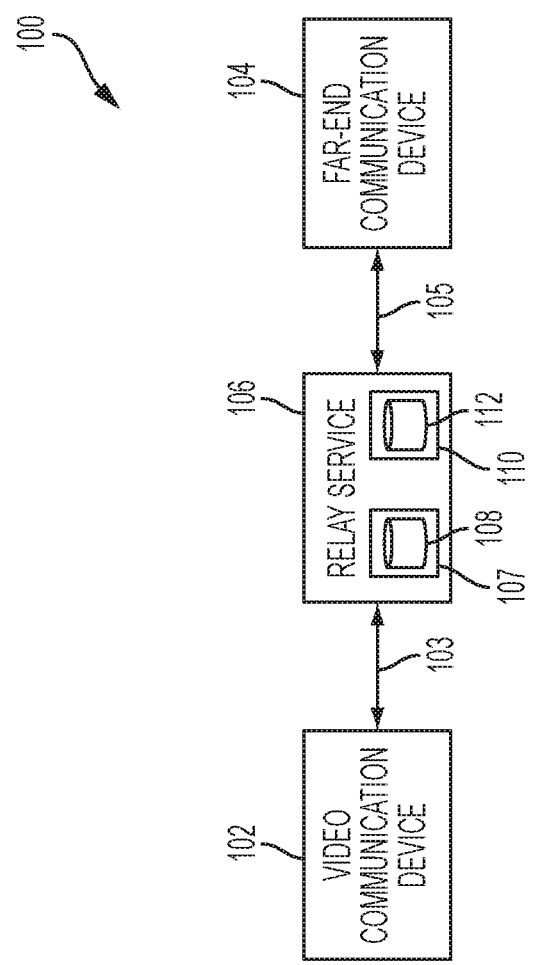
FIG. 1 is a simplified block diagram of a communication system.

In the following detailed description, reference is made to the accompanying drawings which form a part hereof, and in which is shown by way of illustration specific embodiments in which the disclosure may be practiced. These embodiments are described in sufficient detail to enable those of ordinary skill in the art to practice the disclosure. It should be understood, however, that the detailed description and the specific examples, while indicating examples of embodiments of the disclosure, are given by way of illustration only and not by way of limitation. From this disclosure, various substitutions, modifications, additions rearrangements, or combinations thereof within the scope of the disclosure may be made and will become apparent to those of ordinary skill in the art.

In accordance with common practice, the various features illustrated in the drawings may not be drawn to scale. The illustrations presented herein are not meant to be actual views of any particular apparatus (e.g., device, system, etc.) or method, but are merely representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus or all operations of a particular method.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It should be understood by a person of ordinary skill in the art that the signal may represent a bus of signals, wherein the bus may have a variety of bit widths and the disclosure may be implemented on any number of data signals including a single data signal.

The various illustrative logical blocks, modules, circuits, and algorithm acts described in connection with embodiments disclosed herein may be implemented as electronic hardware, computer software, or combinations of both. To clearly illustrate this interchangeability of hardware and software, various illustrative components, blocks, modules, circuits, and acts are described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments of the disclosure described herein.

A processor herein may be any processor, controller, microcontroller, system on a chip, or state machine suitable for carrying out processes of the disclosure. A processor may also be implemented as a combination of computing devices, such as a combination of a DSP and a microprocessor, a plurality of microprocessors, one or more microprocessors in conjunction with a DSP core, or any other such configuration. When configured according to embodiments of the disclosure, a special-purpose computer improves the function of a computer because, absent the disclosure, the computer would not be able to carry out the processes of the disclosure. The disclosure also provides meaningful limitations in one or more particular technical environments that go beyond an abstract idea. For example, embodiments of the disclosure provide improvements in the technical field of telecommunications, particularly in a telecommunication system including a video relay service for providing sign language interpretation services to assist hearing-impaired users. Embodiments include features that improve the functionality of the communication devices of the video interpreters and the VRS network of call centers and call stations including the various video communication devices associated with video interpreters such that a new and improved network and method feature is enabled by the devices for remote video interpreters to provide assistance during a live communication session. As a result, the interaction of the video communication devices with other systems may be improved to provide better translation services in addition to an improved user experience.

In addition, it is noted that the embodiments are described in terms of a process that is depicted as a flowchart, a flow diagram, a structure diagram, or a block diagram. Although a flowchart or signal diagram show operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more computer-readable instructions (e.g., software code) on a computer-readable medium. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations are used herein as a convenient method of distinguishing between two or more elements or instances of an element. Thus, a reference to first and second elements does not mean that only two elements can be employed or that the first element must precede the second element in some manner. Also, unless stated otherwise a set of elements may comprise one or more elements.

As used herein, the terms "connect," "connecting," "connection," and other derivations of "connect" refer to communicating or establishing a communication session between two or more elements. These terms do not necessarily mean that there is a physical connection between the elements. The "connection" may be through an appropriate wireless communication network as well as a wired communication network. It should be understood that the phrase "connecting a user" (or variations thereof) is a shorthand way to describe connecting the device associated with the user with another device associated with another user. Similarly, it should be understood that phrases such as "transmitting data to a user," "receiving data from a user," "communicating with a user" are also shorthand for data communication between the communication devices associated with the respective users.

Embodiments of the disclosure include apparatuses and methods for operating a telecommunication system. In a typical relay system environment, a video communication device is operated by a user having an hearing impairment, and the far-end communication device is operated by an hearing-capable user. For convenience, a video communication device may also be referred to as a "near-end" device or a "far-end" device. The user of a video communication device may be referred to as "near-end user" or a "far-end user." Of course, it is recognized that "near-end" and "far-end" are relative terms depending on the perspective of the particular user. Most examples herein are described from the perspective of the hearing-impaired user. Thus, the terms "near-end" and "far-end" are to be understood as a convenient way of distinguishing between devices or users. It is also recognized that calls that involve the VRS system can originate from either the hearing-impaired user or the hearing-capable user.

FIG. 1 is a simplified block diagram of a communication system 100. The communication system 100 includes a video relay service (VRS) 106 configured to facilitate communication between hearing-impaired users and far-end users (e.g., hearing-capable users, computerized systems, etc.). The depicted communication system 100 includes a video communication device 102 and a far-end communication device 104 that are configured to participate in communication sessions via a video relay service 106 through one or more networks. During a live communication session the video communication device 102 is connected to the video relay service 106 over a first connection 103, and the video relay service 106 is connected to the far-end communication device 104 over a second connection 105.

It should be understood that the video communication device 102, the far-end communication device 104, and the video relay service 106 may be configured to transmit the data signals over one or more networks. The networks used for conveying the data signals may include an internet protocol (IP) network. The networks may also include other networks, such as, for example, public switched telephone networks (PSTNs). The networks may include a wide area network (WAN), a local area network (LAN), a personal area network (PAN), and wireless cell networks such as FDMA, TDMA, CDMA, OFDMA, etc. and combinations thereof. In some embodiments, the networks may include a cloud network. The networks may be configured to facilitate wireless communications, communications through cables, and combinations thereof. Some non-limiting examples of suitable wireless communications may include "Wi-Fi" and mobile wireless networks. Some non-limiting examples of suitable cables include fiber-optic cables, coaxial cables, traditional telephone cables, and Ethernet cables.

In some embodiments, the video communication device 102 comprises a communication device specifically configured for use by an hearing-impaired user. Communication devices that may be used to assist users having such an impairment may include a video phone device, a keyboard, a remote control, other devices or accessibility interfaces, and combinations thereof. The video communication device 102 may include a computing device configured to execute software directed to perform such communication capabilities. In such an embodiment, the computing device may be modified with software to operate as a video communication device. Examples of suitable computing devices may include a desktop computer, a laptop computer, a tablet computer, a personal digital assistant (PDA), a smartphone, a set top box coupled with a monitor (e.g., television) and camera (e.g., webcam), and other computing devices. Communication devices may also be referred to as "endpoints."

Video data (e.g., streaming image data captured by a camera) may be transmitted from the video communication device 102 to the video relay service 106 over the first connection 103. The video data may include content such as the sign language gestures made by the near-impaired user. If the near-end user has at least some speech capabilities (e.g., users that are hearing-impaired, but have some ability to speak), voice data may be transmitted from the video communication device 102 to the video relay service 106 over the first connection 103. Video data may be transmitted from the video relay service 106 to the video communication device 102. If the near-end user has at least some audible-capabilities (e.g., users that are not completely deaf), voice data may be transmitted in addition to the video data from the video relay service 106 to the video communication device 102. In some embodiments, however, audio from the video communication device 102 may be disabled such that the video relay service 106 and/or the far-end communication device 104 may not be able to hear any speech or other audible noise from the video communication device 102.

Voice data (e.g., streaming audio data captured by a microphone) may be transmitted from the far-end communication device 104 to the video relay service 106 over the second connection 105. The voice data may include content such as the spoken language made by the near-impaired user. Voice data generated by the far-end user is not limited to live voice from a live person. For example, the far-end user may include an automated telephone menu system that transmits voice data that includes synthesized voice, recorded voice, or other audible information intended to convey information (e.g., interactive voice response (IVR)). Voice data and/or text data may be transmitted from the video relay service 106 to the far-end communication device 104 over the second connection 105. This voice data may include content such as the translated synthesized voice translated from the sign-language content generated by the hearing-impaired user as translated by the video relay service 106.

The video relay service 106 is configured to interpret communication between the video communication device 102 and the far-end communication device 104 to facilitate assisted communication sessions therebetween. The video relay service 106 may include a customer profile server 107 including a customer database 108 and other databases storing information from which the video relay service 106 may query to authenticate registered users, establish communication sessions, route communication sessions, etc. For example, the customer database 108 may include customer records including the name, address (e.g., street address, city, state, zip code, etc.), and other information for establishing the user as a valid customer (e.g. subscriber) of the video relay service 106 for participating in assisted calls. Customers of the video relay service 106 may be assigned one or more phone numbers or other identifiers (e.g., IP address) known to the video relay service 106 and/or other communication providers as being associated with a hearing-impaired user, such as being stored in a registry or database for hearing-impaired users. The customer database 108 may also include information about characteristics of the customer (e.g., needed skills, preferences, etc.). The information of the customer database 108 may be stored and updated in data objects managed by the video relay service 106.

The video relay service 106 may also include a routing server 110. The routing server 110 may include a video interpreter database 112 with video interpreter records including the name, current work station information, current login status, and other information about the video interpreter (e.g., performance ratings, seniority, skills, attributes, etc.) The information of the video interpreter database 112 may be stored and updated in data objects managed by the video relay service 106. The routing server 110 may also be configured to perform features such as call routing, establishing connections between communication devices during a communication session, and managing remote teaming requests as discussed below.

For simplicity, the customer profile server 107 and the routing server 110 may each be referred to in the singular; however, it should be understood that one or more servers may be used to perform the operations executed by the customer profile server 107 routing server 110. Likewise, some of the functionality of the customer profile server 107 and the routing server 110 may be combined or performed by the other, or by other servers of the video relay service 106.

Figure 2:
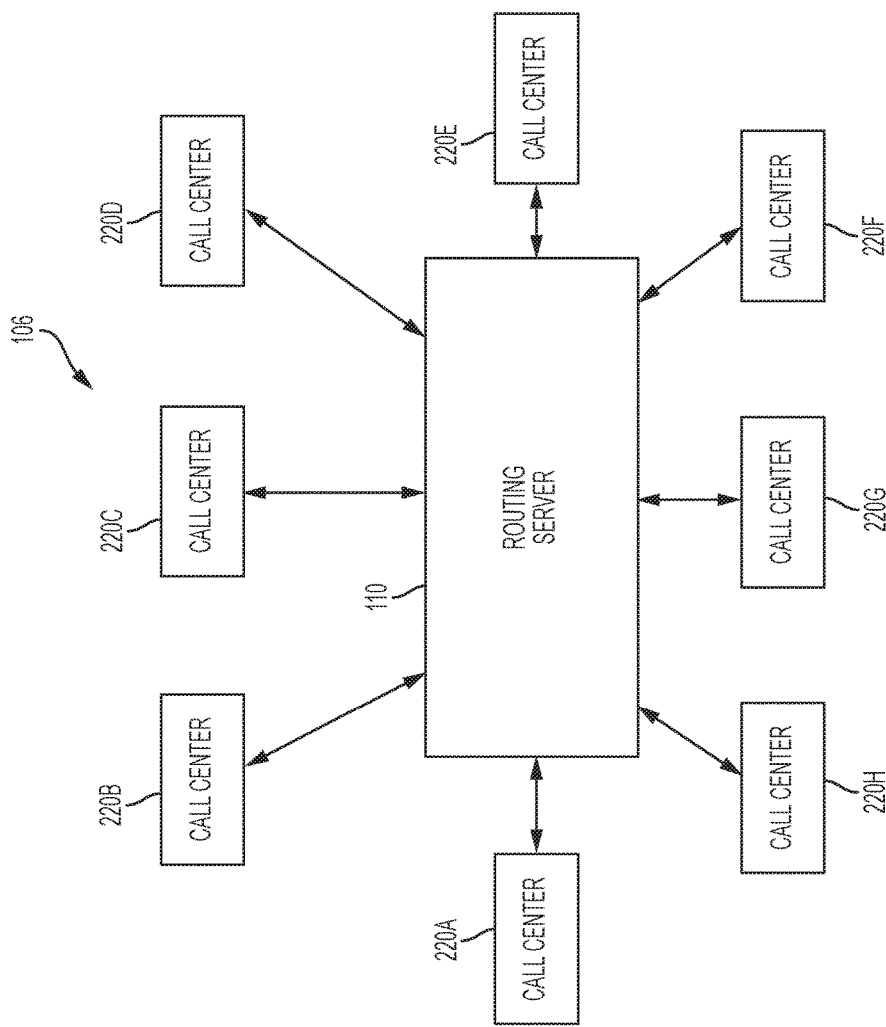
FIG. 2 is a block diagram of the video relay service of FIG. 1.

FIG. 2 is a block diagram of the video relay service 106 of FIG. 1. The video relay service 106 includes call centers 220A-220H at multiple different physical locations. For example, a first call center 220A is at a first location (e.g., Cleveland, Ohio), a second call center 220B is at a second location (e.g., Toronto, Canada), a third call center 220C is at a third location (e.g., San Juan, Puerto Rico), a fourth call center 220D is at a fourth location (e.g., Los Angeles, Calif.), and so on. Each call center 220A-220H employs individual video interpreters who work at their own work station that includes a video communication device may be similarly configured as the device of the hearing-impaired user, but with additional functionality specific to performing the video interpreter's responsibilities. In some embodiments, a video interpreter may work from home rather than a call center with many video interpreters. Such an arrangement is also included as embodiments of the disclosure. Thus, unless explicitly stated to the contrary, a call center may include an individual work station, such as may be the case with an individual video interpreter working from home or other telecommuting situation.

Each work station at each call center 220A-220H is coupled to the routing server 110 that is configured to perform features such as call routing, establishing connections between communication devices during a communication session, and managing remote teaming requests as discussed below.

In operation, when a video interpreter desires teaming assistance while on a call, the teaming request may be transmitted from the video interpreter's work station to the routing server 110 for execution of the teaming request. The routing server 110 may manage the teaming request by fulfilling the teaming request with a video interpreter at a remote call center 220B. For example, a requesting video interpreter at the first call center 220A in Cleveland, Ohio may desire teaming assistance that is ultimately provided by a video interpreter at the second call center 220B located in Toronto, Canada. As a result, it may not be necessary for the assisting video interpreter to be physically present to provide the teaming assistance to the requesting video interpreter. As a result, more teaming requests can be fulfilled, more quickly, and/or with a video interpreter that is more suited for the call. For example, an interpreter with a specific technical skill or vocabulary base may be available at a remote call center. In some embodiments, a native sign language speaker may be desired to perform the teaming assistance. Embodiments of the disclosure enable the VRS system 100 to offer an available video interpreter with such skills or attributes from a remote call center even though such a video interpreter may not be available or even employed by the local call center.

The routing server 110 typically processes the teaming request according to rules established by the VRS system and/or the teaming request itself. In some embodiments, the routing server 110 queries a database of work stations currently logged into the system to identify the status and availability for a video interpreter. In some embodiments, the routing server 110 maintains a continuous list of the idle work stations that are logged into the system according to the length of inactivity to expedite the query time needed to identify the video interpreter to select. The routing server 110 transmits a teaming message to the selected video interpreter to inform that a teaming request has been made—giving the option for the video interpreter to accept or decline providing the teaming assistance through a message that is displayed on the video interpreter's work station. If the teaming request is declined (or if it is ignored for a predetermined period of time), the message may be removed and the routing server 110 may select the next video interpreter for requesting teaming assistance. In some embodiments, the routing server 110 may transmit the teaming message to more than one available interpreter to increase the response time for teaming assistance by connecting the video interpreter who accepts the teaming message first. In some embodiments, the routing server 110 queries the database of work stations currently logged into the system to identify the video interpreter that has been idle the longest period of time without a call. As a result, better balance and/or efficiency may be achieved in the usage of the video interpreters across all call centers 220A-220H.

In some embodiments, the teaming rules may first attempt to fulfill the teaming request with a local video interpreter (i.e., located at the same call center as the requesting video interpreter) before selecting a remote video interpreter. Thus, the routing server 110 may perform a first query that is limited to the local video interpreters located within the same call center, and then a second query that is open to all remote video interpreters of the VRS system. As a result, if the assisting video interpreter is located within the same call center, the option for physically moving to the requesting video interpreter's work station may be available rather than only providing remote teaming assistance.

In some embodiments, desired skills and/or attributes are considered by the routing server 110 when processing the teaming request. For example, an assisting video interpreter with a certain skill may be desired by the requesting video interpreter. Thus, the video interpreter database 112 may include different skills possessed by each video interpreter, such as verbal language skills (e.g., English, Spanish, etc.), sign language skills (e.g., native sign language proficiency), subject matter skills (e.g., medical, legal, computer/tech, etc.), and other similar skill sets.

In some embodiments, other classifications or rankings are considered by the routing server 110 when processing the teaming request. For example, the video interpreter database 112 may include different seniority levels for each video interpreter, such that more senior or experienced video interpreters may be selected for teaming assistance and junior or less experienced video interpreters may not be selected for teaming assistance or in some cases given lower priority for selection. As another example, the video interpreter database 112 may include quality rankings based on performance reviews, customer feedback, feedback from other video interpreters from past teaming requests, or other sources to determine a quality metric for a video interpreter.

In some embodiments, a combination of such factors are considered by the routing server 110 when processing the teaming request. For example, a teaming request may indicate that a native sign language interpreter is desired; however, more than one such a video interpreter may be available. In such a situation, the routing server 110 may select the native sign language interpreter that has been idle the longest without a call. Other priorities and weighting of factors is also contemplated.

In addition, some teaming requests may include certain factors as being optional or required by the requesting video interpreter. In such a situation, if the factor is optional, the routing server 110 may attempt to identify an available video interpreter that meets the criteria of the teaming request. However, if no such video interpreter is available, a different video interpreter may be selected anyway. If the factor is required, routing server 110 may attempt to identify an available video interpreter that meets the criteria of the teaming request. However, if no such video interpreter is available, the routing server 110 may not immediately fulfill the teaming request. The routing server 110 may inform the requesting video interpreter that a video interpreter having the required criteria is not available, at which point the requesting video interpreter may withdraw the teaming request and continue the call without any assistance. In some embodiments, the routing server 110 may continue to monitor the status of the video interpreters meeting the required criteria for as long as the call is still active. As a result, the requesting video interpreter may continue the call without any assistance until such a video interpreter becomes available.

Certain types of calls (e.g., a 911 emergency call) may receive higher priority for certain skills or attributes. For example, if requesting video interpreter receives a 911 emergency call that requires an assisting video interpreter to have a particular skill level that is currently unavailable, the routing server 110 may identify such video interpreters who possess that required skill or attribute and is already on a teaming request. The routing server 110 may then execute swap of a remote video interpreter already assisting another non-emergency call with another remote video interpreter that does not possess the skill but may still be suited to handle the non-emergency call. As a result, the routing server 110 may transmit teaming messages to parties of the non-emergency call in inform the assisting and requesting interpreters that the assisting video interpreter is needed elsewhere on an emergency call and that a swap is about to occur. After acceptance, the routing server 110 connects the busy interpreter to the new emergency call to provide the teaming assistance, and the available video interpreter to the old non-emergency call to provide the teaming assistance.

The factors for the routing server 110 to consider can be incorporated within the teaming request itself. For example, the requesting video interpreter may select the desired skills (e.g., optional or required) that are then transmitted with the teaming request. The video interpreter's user interface may have a menu or other input features for the video interpreter to select from when initiating the teaming request. In some embodiments, the factors can be determined automatically by the routing server 110 and/or the video interpreter's work station without user input. For example, the call may be known to involve a user having a specific needed skill based on flags associated with the user account, phone number, or other signaling methods. Thus, the video interpreter may not specifically request the skill with the teaming request; however, the routing server 110 may receive such information and perform the appropriate processing as if the requesting video interpreter had made such a selection.

Figure 3:
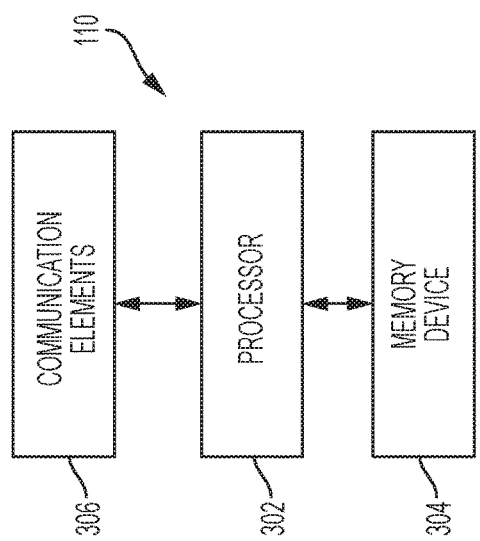
FIG. 3 is a simplified block diagram of the routing server of FIG. 2.

FIG. 3 is a simplified block diagram of the routing server 110 of FIG. 2. The routing server 110 includes a processor 302 operably coupled with a memory device 304 and communication elements 306. The processor 302 is configured to coordinate the communication between the various devices as well as execute instructions stored in computer-readable media of the memory device 304. The memory device 304 includes volatile and/or non-volatile memory storage for the routing server 110. The memory device 304 may also have the customer database 108 and video interpreter database 112 stored therein. The communication elements 306 include devices such as receivers, transmitters, transceivers, etc., that are configured to communicate with external devices (e.g., administrator computers, employee computers, etc.). In some embodiments, the routing server 110 may include other devices (e.g., input devices, output devices, etc.) if needed to facilitate its processes. The routing server 110 also executes (via processor 302) the call routing and/or remote teaming operations as described herein.

Figure 4:
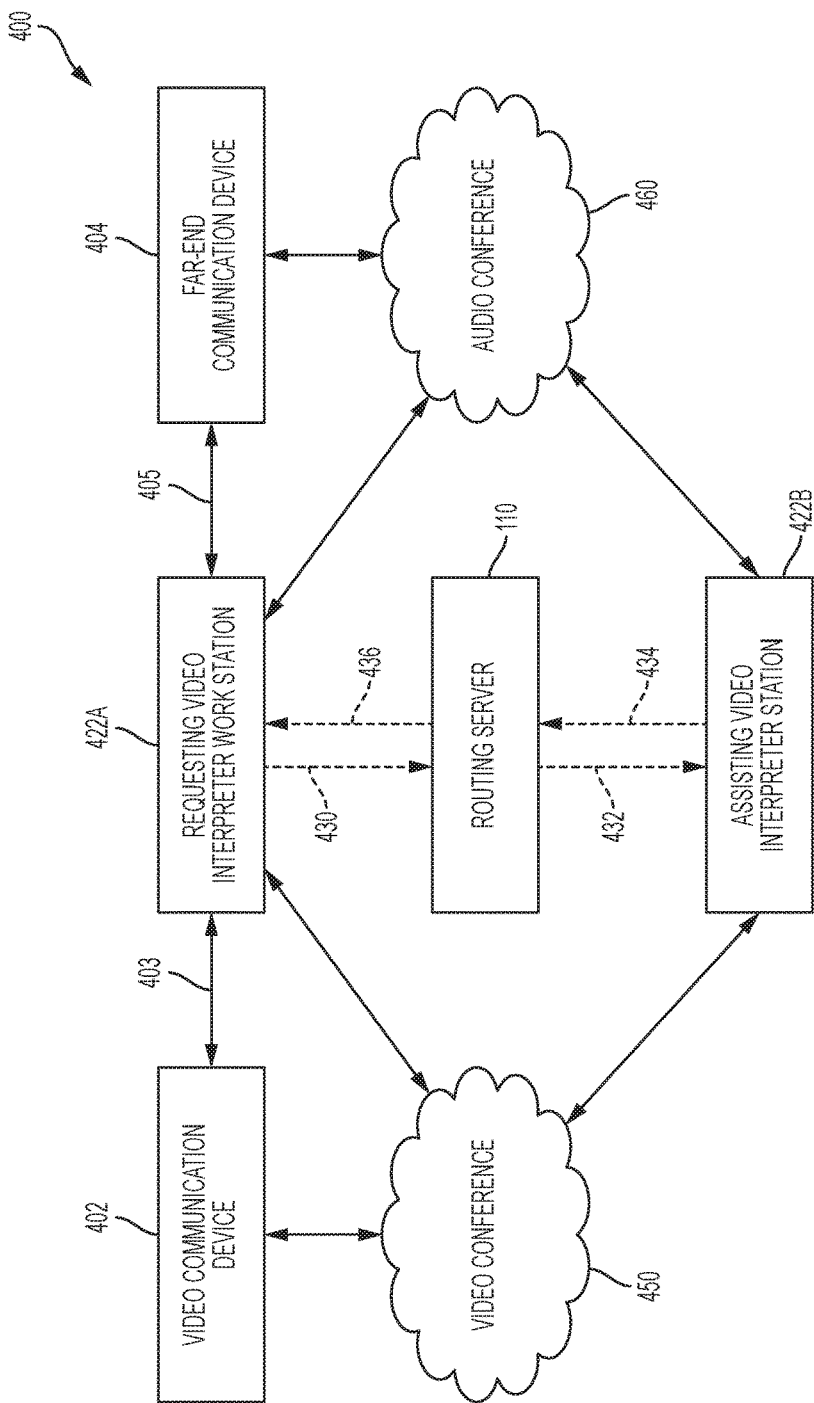
FIG. 4 is schematic block diagram of the communication system illustrating a remote teaming connection according to an embodiment of the disclosure.

FIG. 4 is schematic block diagram of the communication system 400 illustrating a remote teaming connection according to an embodiment of the disclosure. The communication system 400 includes a video communication device 402 associated with a hearing-impaired user, a first video interpreter work station 422A (also referred to as the requesting video interpreter work station 422A) associated with a first video interpreter, and a far-end communication device 404 associated with a hearing-capable user. For purposes of discussion, it is presupposed that a communication is already established between the video communication device 402 and the far-end communication device 404, with the requesting video interpreter work station 422A performing the translation services as discussed above. The communication system 400 further includes a second video interpreter workstation 422B (also referred to as the assisting video interpreter work station 422B) that is located at a different call center remote from the first video interpreter work station 422A.

During the live communication session (or automatically during call set up in the case of an emergency 911 type call) a teaming assistance session may also be established. For example, the first video interpreter may identify a need for additional assistance during the call. The requesting video interpreter work station 422A transmits a teaming request 430 to the routing server 110. The routing server 110 receives the teaming request 430 and process it according to the teaming rules established by the video relay service 106. The routing server 110 may query the login and inactive status of each of the video interpreter work stations across the call centers of the VRS system along with any other factors to be considered by the teaming rules as discussed above. The routing server 110 then sends a teaming request 432 for display by the selected video interpreter work station 422B (or multiple video interpreter work stations as permitted by the teaming rules) to be accepted or rejected. In response to the assisting video interpreter accepting the teaming request, the assisting video interpreter work station 422B transmit an acceptance message 434 to the routing server 110 that is then routed as an acceptance message 436 to the requesting video interpreter work station 422A.

In response to the teaming request being accepted, the video relay service 106 creates a video conference 450 and an audio conference 460 during the live communication session. The video conference 450 is joined by the video communication device 402, the requesting video interpreter work station 422A, and the assisting video interpreter work station 422B. The audio conference 460 is joined by the requesting video interpreter work station 422A, the far-end communication device 404, and the assisting video interpreter work station 422B. In some embodiments, the first connection 403 and the second connection 405 may be extinguished while the video conference 450 and the audio conference 460 are established. If the teaming assistance is no longer needed, but the call is to continue, the first connection 403 and the second connection 405 may be re-established before disconnecting the video conference 450 and the audio conference 460. As a result, the assisting video interpreter work station 422B is entered back into the pool of available video interpreters to receive a new call or a different teaming request by updating its status in the video interpreter database.

The assisting video interpreter station 422B may create the video conference 450 within a conferencing server of the VRS system, and transmit the video conference information with the acceptance message 434 to inform the requesting video interpreter work station 422A how to connect to the video conference 450 (e.g., such information may also be included with the acceptance message 436). The video communication device 402 associated with the hearing-impaired user may also receive the video conference information from the requesting video interpreter work station 422A, the routing server 110, and/or the assisting video interpreter work station 422B directly. The video conference 450 may be hosted by a server that may include a multipoint control unit (MCU) configured to bridge the video conferencing connections of the different devices and mix the video streams. Establishing the video conference 450 may be executed automatically without user input by including the video conference information within the signaling between the different devices as each device may be controllable by the VRS system.

During the video conference session, the requesting video interpreter work station 422A may receive and display all video streams from the different devices. In other words, the user interface for the requesting video interpreter work station 422A may display the video stream for the video communication device 402 and the assisting video interpreter work station 422B (as well as its own video stream). Likewise, the assisting video interpreter work station 422B may receive and display all video streams from the different devices. In other words, the user interface for the assisting video interpreter work station 422B may display the video stream for the video communication device 402 and the requesting video interpreter work station 422A (as well as its own video stream). In some embodiments the video communication device 402 may also receive and display all video streams; however, it may be desirable for the video stream for the assisting video interpreter work station 422B to not be shown to the video communication device 402 as it may be confusing for the hearing-impaired user to know which of the interpreters to focus on for the interpretation.

The assisting video interpreter station 422B may create the audio conference 460 within a conferencing server of the VRS system, and transmit the audio conference information with the acceptance message 434 to inform the requesting video interpreter work station 422A how to connect to the audio conference 460 (e.g., such information may also be included with the acceptance message 436). The far-end communication device 404 associated with the hearing-capable user may also receive the audio conference information from the requesting video interpreter work station 422A, the routing server 110, and/or the assisting video interpreter work station 422B directly. The audio conference 460 may be hosted by a server that may include a multipoint control unit (MCU) configured to bridge the audio conferencing connections of the different devices and mix the audio streams. Establishing the audio conference 460 may be executed automatically without user input by including the audio conference information within the signaling between the different devices.

During the audio conference session, the requesting video interpreter work station 422A receives and output audio streams from the other participating devices. In other words, the processor and speaker system for the requesting video interpreter work station 422A reproduce the audio stream for the far-end communication device 404 and the assisting video interpreter work station 422B. Likewise, the assisting video interpreter work station 422B receives and reproduces all video streams from the other participating devices. In other words, the speaker system for the assisting video interpreter work station 422B reproduces the audio stream for the far-end communication device 404 and the requesting video interpreter work station 422A. Other messaging features (e.g., instant messaging) may also be incorporated into the requesting video interpreter's user interface if such communication may be desirable. The far-end communication device 404 may receive and reproduce the audio stream for the requesting video interpreter work station 422A and not the assisting video interpreter work station 422B to not be confusing for the hearing-capable user to understand which of the interpreters to focus on for the interpretation.

In some embodiments, the video conference 450 and/or the audio conference 460 is hosted on cloud-based servers of the VRS system. In some embodiments, video conference 450 and/or the audio conference 406 is hosted on cloud-based servers of the third-party systems. In some embodiments, the requesting video interpreter work station 422A or the assisting video interpreter work station 422B may host the video conference 450 or the audio conference 460. For example, because the far-end communication device 404 may not be controllable by the VRS system, it may be desirable for the requesting video interpreter work station 422A to host the audio conference 460 itself rather than on the cloud because transfer of the second connection 405 to the audio conference 460 may be less complicated without involving user input by the hearing-capable user. In yet other embodiments, a single server may host both the video conference 450 and the audio conference 460.

At the close of the call and/or the teaming assistance, the call details are stored by the VRS system to identify which video interpreters were part of the call, their individual roles (e.g., requesting/assisting), call duration, teaming assistance duration, as so on. Such information may be desired for billing purposes, staffing purposes, etc.

Figure 5:
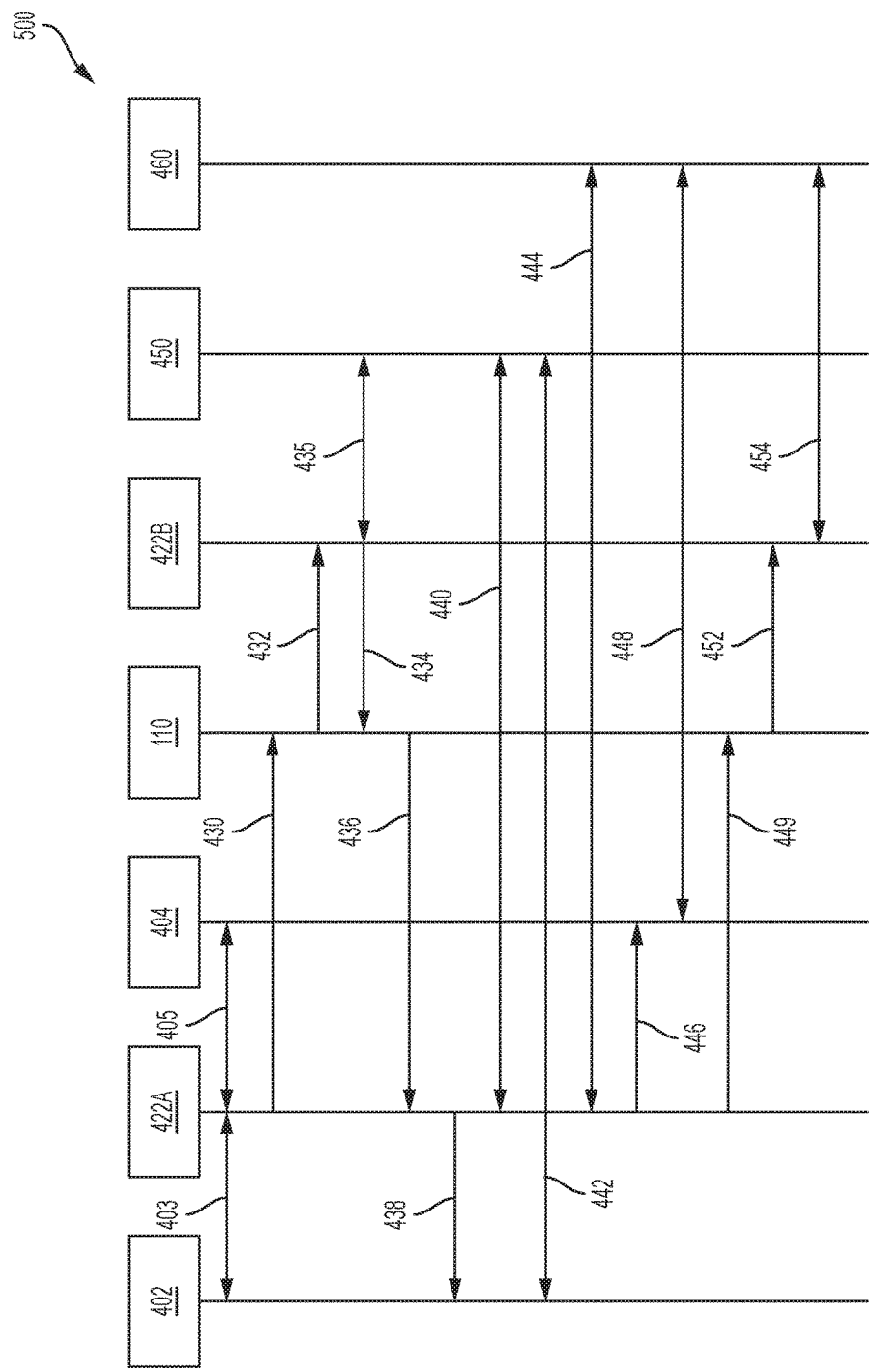
FIG. 5 is a signal diagram illustrating a method for establishing a remote teaming session according to an embodiment of the disclosure.

FIG. 5 is a signal diagram 500 illustrating a method for establishing a remote teaming session according to an embodiment of the disclosure. As discussed above, the video relay service 106 may have already established a communication session between the video communication device 402, the first video interpreter workstation 422A, and the far-end communication device 404 through connections 403, 405. During the communication session, the first video interpreter may select an input through the user interface that causes the first video interpreter workstation 422A to transmit a teaming request 430 to the routing server 110. In some embodiments, the teaming request may be automatically generated during call setup (e.g., in an emergency 911 call). The routing server 110 transmits a teaming message to the second video interpreter workstation 422B (or multiple video interpreter workstations) to initiate a message on the display of the second video interpreter workstation 422B requesting of acceptance of the teaming request. The second video interpreter work station 422B transmits the acceptance (or rejection) response 434 to the routing server 110, which then forwards the response 436 to the first video interpreter work station 422A.

The second video interpreter work station 422B may also create and connect 435 to the video conference 450. As the acceptance message 434 may include the video conference information, the pass such information 438 to the video communication device 402. The first video interpreter work station 422A may connect 440 to the video conference 450, and the video communication device 402 may also connect 442 to the video conference 450.

The first video interpreter work station 422A may also create and connect 444 to the audio conference 460. The first video interpreter work station 422A may also facilitate the transfer 446 of the far-end communication device 404 to connect 448 to the audio conference 460. The first video interpreter work station 422A may also transmit the audio conference information 449 to the routing server 110 to forward 452 to the second video interpreter work station 422B. The second video interpreter work station 422B then connects to the audio conference 460.

While certain illustrative embodiments have been described in connection with the figures, those of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. In addition, features from one disclosed embodiment may be combined with features of another disclosed embodiment while still being encompassed within the scope of embodiments encompassed by the disclosure as contemplated by the inventors.

What is claimed is:

1. A communication system for providing sign language translation services during a real-time communication session, the communication system comprising:
    a video relay service configured to:
        establish a first connection for transmitting a video stream between a first video interpreter workstation associated with a video interpreter and a video communication device associated with a hearing-impaired user;
        establish a second connection for transmitting an audio stream between the first video interpreter workstation and a far-end communication device associated with a hearing-capable user; and
        create a video conference and an audio conference for a second video interpreter at a second video interpreter work station to provide teaming assistance as an assisting video interpreter responsive to receiving a teaming request from the first video interpreter workstation, wherein the first video interpreter work station and the second video interpreter work station are located at different call centers remote from each other, and wherein the video relay service comprises a routing server configured to select the second video interpreter work station from among a plurality of video interpreter work stations located at different call centers of the video relay service.

2. The communication system of claim 1, wherein the video relay service is configured to create the video conference to be hosted on a cloud-based server.

3. The communication system of claim 2, wherein the cloud-based server is a third party cloud-based server that is not part of the video relay service.

4. The communication system of claim 1, wherein the video relay service is configured to create the audio conference to be hosted on a cloud-based server.

5. The communication system of claim 1, wherein the video relay service is configured to create the audio conference to be hosted on the first video interpreter workstation.

6. The communication system of claim 1, wherein the video relay service is configured to host the video conference and the audio conference on a same server.

7. The communication system of claim 1, wherein the routing server is configured to select the second video interpreter work station based, at least in part, on querying a status and determining an inactivity time of each of the video interpreter work stations.

8. The communication system of claim 1, wherein the routing server is configured to select the second video interpreter work station based, at least in part, on a desired skill identified in the teaming request for the assisting video interpreter.

9. The communication system of claim 1, wherein the routing server is configured to select the second video interpreter work station based, at least in part, on a seniority for the assisting video interpreter.

10. A video relay service comprising:
    a plurality of call centers having one or more video interpreter work stations associated with video interpreters to provide sign language interpretation to assist hearing-impaired users in communicating with hearing-capable users during real-time communication sessions; and
    a routing server operably coupled with the video interpreter work stations at the plurality of call centers, and configured to:
        facilitate a teaming request from a requesting video communication workstation for assistance from an assisting video communication workstation at a remote call center during a real-time communication session; and
        select the assisting video interpreter workstation from among a plurality of video interpreter workstations located at different call centers of the video relay service.

11. The video relay service of claim 10, wherein the routing server includes a video interpreter database including status information about the video interpreter work stations.

12. A video relay service comprising:
    a plurality of call centers having one or more video interpreter work stations associated with video interpreters to provide sign language interpretation to assist hearing-impaired users in communicating with hearing-capable users during real-time communication sessions; and
    a routing server operably coupled with the video interpreter work stations at the plurality of call centers, including a video interpreter database including status information about the video interpreter work stations, and configured to:
        facilitate a teaming request from a requesting video communication workstation for assistance from an assisting video communication workstation at a remote call center during a real-time communication; and query the status information and select the assisting video communication workstation based on a length of inactivity since a prior call.

13. A video relay service comprising:
a plurality of call centers having one or more video interpreter work stations associated with video interpreters to provide sign language interpretation to assist hearing-impaired users in communicating with hearing-capable users during real-time communication sessions; and
a routing server operably coupled with the video interpreter work stations at the plurality of call centers, including a video interpreter database including status information about the video interpreter work stations, and configured to:
facilitate a teaming request from a requesting video communication workstation for assistance from an assisting video communication workstation at a remote call center during a real-time communication; and
routing server is configured to query the status information and select the assisting video communication workstation after first querying availability of a local video communication workstation within a same call station as the requesting video interpreter workstation.

14. A method of facilitating a remote teaming session during a real-time communication session with a hearing-capable user, a hearing-impaired user, and a video interpreter within a video relay service, the method comprising:
generating a teaming request for a requesting video interpreter workstation of the video relay service during a communication session with a video communication device associated with the hearing-impaired user and a far-end communication device associated with the hearing-impaired user;
selecting a remote video interpreter workstation from among a plurality of video interpreter workstations located at different call centers of the video relay service;
transmitting a teaming message to the remote video interpreter workstation at a different call center location than the requesting video interpreter workstation;
displaying the teaming message on an electronic display of the remote video interpreter workstation requesting acceptance or rejection of the teaming request; and
creating a video conference and an audio conference for the requesting video interpreter workstation and the remote video interpreter workstation to facilitate the remote teaming session during the communication session to provide sign language translation services between the video communication device and the far-end communication device.

15. The method of claim 14, wherein creating the video conference and the audio conference includes hosting both on a same multipoint control unit.

16. The method of claim 14, wherein:
creating the video conference includes the requesting video interpreter workstation, the video communication device, and the remote video interpreter workstation joining the video conference; and
creating the audio conference includes the requesting video interpreter workstation, the far-end communication device, and the remote video interpreter workstation joining the audio conference.

17. The method of claim 16, further comprising each of the requesting video interpreter workstation and the remote video interpreter workstation receiving and displaying all video streams of the video conference.

18. A method of facilitating a remote teaming session during a real-time communication session with a hearing-capable user, a hearing-impaired user, and a video interpreter within a video relay service, the method comprising:
generating a teaming request for a requesting video interpreter workstation of the video relay service during a communication session with a video communication device associated with the hearing-impaired user and a far-end communication device associated with the hearing-impaired user;
transmitting a teaming message to a remote video interpreter workstation at a different call center location than the requesting video interpreter workstation;
displaying the teaming message on an electronic display of the remote video interpreter workstation requesting acceptance or rejection of the teaming request; and
creating a video conference and an audio conference to facilitate the remote teaming session,
wherein:
creating the video conference includes the requesting video interpreter workstation, the video communication device, and the remote video interpreter workstation joining the video conference;
creating the audio conference includes the requesting video interpreter workstation, the far-end communication device, and the remote video interpreter workstation joining the audio conference;
each of the requesting video interpreter workstation and the remote video interpreter workstation receive and display all video streams of the video conference; and
the video communication device only display video streams from the requesting video interpreter workstation and the video communication device from the video conference, but not the remote video interpreter workstation.

19. The method of claim 14, wherein:
creating the video conference is initiated by the remote video interpreter workstation; and
creating the audio conference is initiated by the requesting video interpreter workstation.

20. The method of claim 14, wherein generating the teaming request for the requesting video interpreter workstation of the video relay service occurs automatically during call setup.

* * * * *